United States Patent [19]

Edwards

[11] Patent Number: 5,187,343
[45] Date of Patent: Feb. 16, 1993

[54] PURGE BLOCK FOR PIPE WELDING

[76] Inventor: Thomas W. Edwards, 5301 Boy Scout Rd., Lawrence, Ind. 46226

[21] Appl. No.: 784,755

[22] Filed: Oct. 30, 1991

[51] Int. Cl.$^5$ ................................. B23K 9/16
[52] U.S. Cl. ...................... 219/74; 138/90; 219/60 R
[58] Field of Search .............. 219/74, 60 R, 137 R; 138/90

[56]  References Cited
U.S. PATENT DOCUMENTS

| | | |
|---|---|---|
| 2,179,176 | 11/1939 | Dunn . |
| 2,317,221 | 4/1943 | Riemenschneider . |
| 2,496,188 | 1/1950 | Wiese . |
| 2,747,065 | 5/1956 | Diehl . |
| 2,787,699 | 4/1957 | Jessen . |
| 2,802,092 | 8/1957 | Hauck . |
| 2,819,517 | 1/1958 | Pursell . |
| 2,966,576 | 12/1960 | Nowotny . |
| 2,985,746 | 5/1961 | Harmes . |
| 3,194,466 | 7/1965 | Davis ........................... 219/60 R |
| 3,194,936 | 7/1965 | Rohrberg et al. . |
| 3,292,254 | 12/1966 | Sloan . |
| 3,387,761 | 6/1968 | Pickard . |
| 3,736,400 | 5/1973 | Spiegel et al. . |
| 3,903,728 | 9/1975 | Matthews, Jr. ........................ 138/90 |
| 4,101,067 | 7/1978 | Sloan et al. . |
| 4,278,864 | 7/1981 | De Facci et al. . |
| 4,302,652 | 11/1981 | Nobileau et al. . |
| 4,828,160 | 5/1989 | Sundholm . |
| 4,875,615 | 10/1989 | Savard . |
| 4,916,281 | 4/1990 | Flasche et al. . |
| 4,931,612 | 6/1990 | Belleride et al. . |

FOREIGN PATENT DOCUMENTS

| | | | |
|---|---|---|---|
| 58-138576 | 8/1983 | Japan | ........... 219/74 |
| 61-37375 | 2/1986 | Japan | ........... 219/74 |
| 2201623 | 9/1988 | United Kingdom | ........... 219/137 R |

Primary Examiner—Clifford C. Shaw
Attorney, Agent, or Firm—Woodard, Emhardt, Naughton, Moriarty & McNett

[57]  ABSTRACT

A purge block with non-inflatable, disc-like seals removably mounted on either end of an elongate tube. In one embodiment, the tube is rigid and hollow and forms part of a conduit for argon or other inert gas through one of said seals to a set of discharge ports adjacent the near end of the other seal. A vent tube extends separately through the first seal. In a second embodiment, the elongate tube is semi-rigid, and a passageway is provided through each seal to discharge ports located adjacent the inner end of each seal to permit gas to flow outside the tube from the inlet end seal of the purge block to and through the outlet end seal.

1 Claim, 3 Drawing Sheets

PURGE BLOCK FOR PIPE WELDING

BACKGROUND OF THE INVENTION

This inventions relates to welding equipment, and more particularly to purge blocks for use in establishing a localized inert atmosphere inside two abutting pipe or tubing sections in the region of a desired weld joint, and to methods for using such purge blocks.

It is conventional in TIG welding and some other welding methods to establish an inert atmosphere inside two abutting pipe or tubing sections in the region of a desired weld joint. It is also conventional to establish an inert atmosphere on the outside of the pipe sections in the region of the desired weld joint, and weld heads are commercially available for establishing this external inert atmosphere as well as performing the welding operation. Without an inert atmosphere, the interior surface of the welded joint is subject to oxidation, other impurities and incomplete fusion of the pipe edges, particularly in the case of stainless steel pipe.

A common practice in the field involves filling an entire pipe line with a protective gas, such as argon, and, typically, providing a continuous flow of argon gas throughout the welding operation. A recognized drawback of this practice is that it consumes a large amount of argon and is therefore more costly than desired.

A known alternative to the above technique involves the use of purge blocks, dams or plugs, which, in one way or another, establish a localized inert atmosphere at the interior surface of a desired weld joint. Numerous such devices have been developed over the last fifty years, as exemplified by the following U.S. patents:

| U.S. Pat. No. | Inventor | Issue Date |
| --- | --- | --- |
| 2,179,176 | Dunn | Nov. 7, 1939 |
| 2,496,188 | Wiese | Jan. 31, 1950 |
| 2,787,699 | Jessen | Apr. 2, 1957 |
| 2,802,092 | Hauck | Aug. 6, 1957 |
| 2,819,517 | Pursell | Jan. 14, 1958 |
| 3,194,466 | Davis | Jul. 13, 1965 |
| 3,194,936 | Rohrberg et al. | Jul. 13, 1965 |
| 3,292,254 | Sloan | Dec. 20, 1966 |
| 3,736,400 | Spiegel et al. | May 29, 1973 |
| 4,278,864 | De Facci et al. | Jul. 14, 1981 |
| 4,828,160 | Sundholm | May 9, 1989 |
| 4,931,612 | Belleride et al. | Jun. 5, 1990 |

Perhaps the most basic technique for localizing the inert atmosphere is to plug both exposed ends of the pipes or tubes to be welded, e.g., as shown in the patent to Jessen. Similarly, some devices consist essentially of separate dams, baffles or other seals which are either removable (Hauck, Sloan, De Facci et al. and Belleride et al.), combustible (Pursell) or water soluble (Spiegel et al.).

A number of devices employ either separate or interconnected inflatable plugs or seals, some of which have been designed to accommodate a number of pipe sizes. See, for example, the patents to Hauck, Davis, Sloan, Sundholm, and Belleride et al. Davis indicates that sealing tubes having a variety of outer diameters may be interchangeably mounted upon supply tubes to accommodate pipes of varied sizes. An extra source of pressure, e.g., air pressure, is commonly required for inflation of such devices, and there is a risk of damage to or rupture of the inflatable members in such devices due to heat generated in the welding operation, in the absence of additional protective design features for the inflatable members, such as shown in the patent to Sundholm, and/or careful placement of such devices prior to welding. Inflatable seals tend to be damaged in particular by a hot weld joint as they are moved past the joint after welding.

The known purge blocks in which seals on opposite ends of a spacer rod or tube are not inflatable, e.g., those in the patents to Dunn, Wiese and Rohrberg et al., do not adequately accommodate more than one pipe size, or are otherwise deficient in some respect. A set of complete tools of different sizes is normally required in welding applications involving different pipe sizes.

For many applications, it is adequate to manually place a purge block in the position for use, either with the aid of a tensioning element such as a wire, cable or the like, or with the aid of a rigid element such as a rod or pipe. Various techniques for moving such devices inside pipes are disclosed, for example, in the patents to Sundholm and Sloan. While such techniques are often adequate for a given application, they are sometimes cumbersome and not as convenient as desired.

SUMMARY OF THE INVENTION

The present invention overcomes these and other advantages of the prior art by providing an improved purge block for use in establishing a localized inert atmosphere inside two abutting pipe sections in the region of a desired weld joint, as well as an improved method of using a purge block.

According to one aspect of the invention, a purge block is constructed with an elongate tube and a non-inflatable, disc-like seal removably mounted on either end of the tube. One of the non-inflatable seals is provided with a passageway therethrough into the space between the seals.

Another aspect of the invention is an improved method of using a purge block, according to which method a purge block with non-inflatable disc-like seals on opposite ends of a spacer tube is manually inserted into a pipe so as to define a chamber having the pipe as a sidewall and one of the seals as an endwall, and then a vacuum is applied to move the purge block in the pipe.

A general object of the present invention is to provide an improved purge block and method of using same in welding operations.

Another object of the invention is to provide a purge block with interchangeability of parts for greater flexibility of use.

A further object of the invention is to provide improvements in techniques for using purge blocks.

Yet another object is provide a purge block which is less susceptible to damage during or after use.

These and other objects and advantages of the present invention will become more apparent upon reading the following detailed description of the preferred embodiment of the invention in conjunction with the accompanying drawings.

DESCRIPTION OF THE PREFERRED EMBODIMENT

Figure 1:
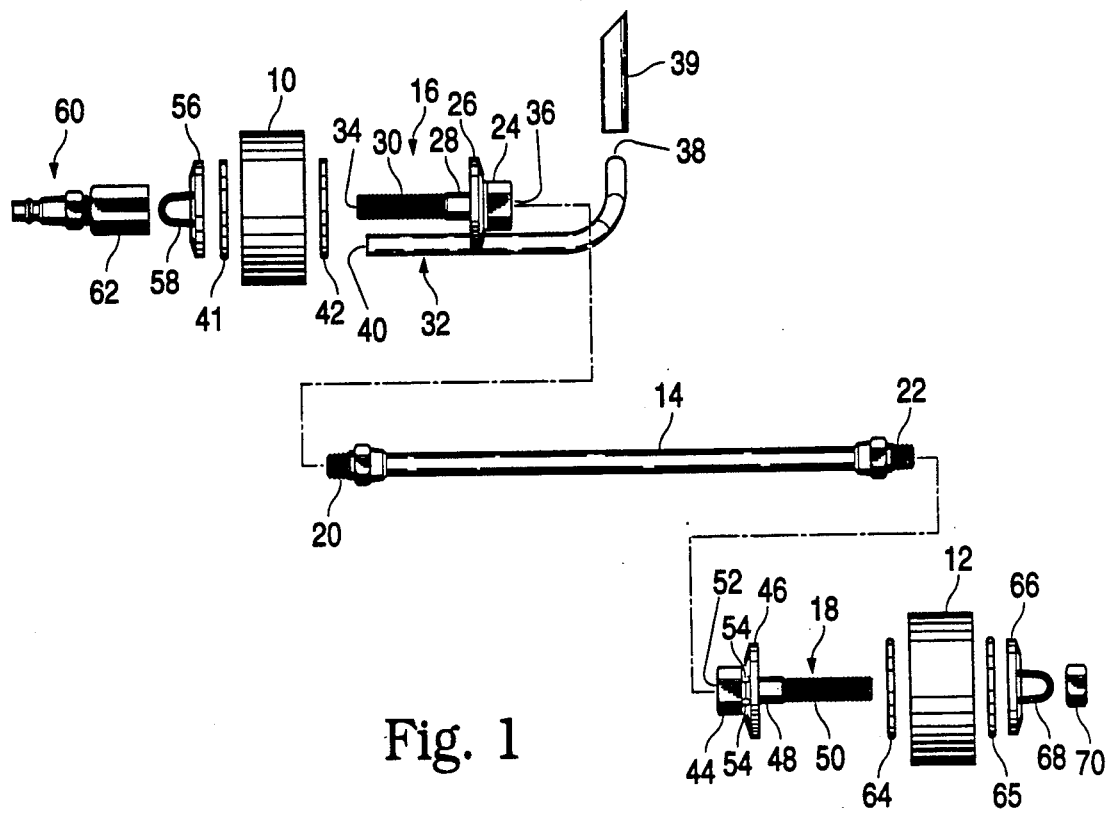
FIG. 1 is an exploded view of a first embodiment of a purge block according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
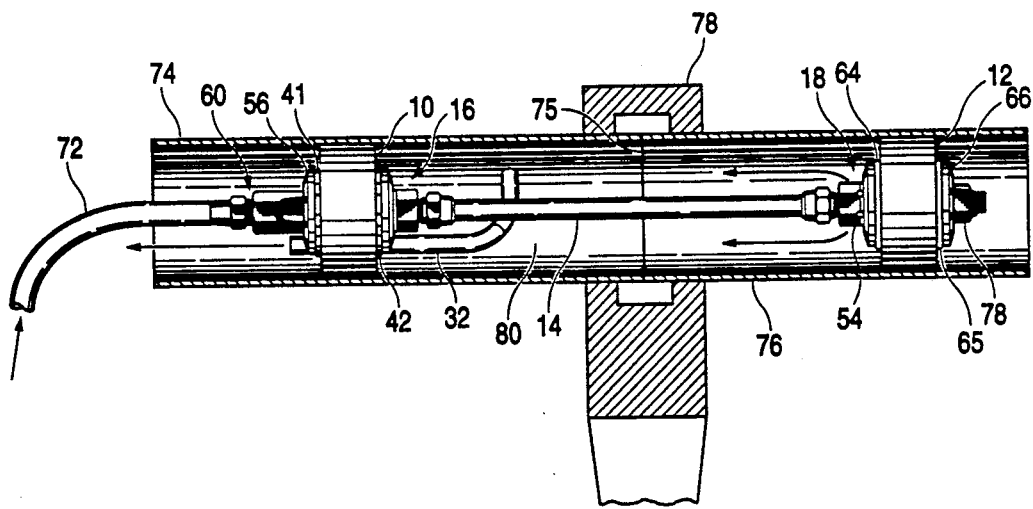
FIG. 2 is a cross-sectional side view of a pair of abutted pipe sections with a purge block of the type shown in FIG. 1 positioned therein.

FIGS. 1 and 2 illustrate a first embodiment of a purge block according to the present invention in which first and second non-inflatable, disc-like seals 10 and 12 are removably mounted on a rigid elongate tube 14. Seals 10 and 12 are mounted on tube 14 via fittings 16 and 18, respectively, which have internally threaded ends for engagement with respective mating externally threaded ends 20 and 22 of tube 14. Tube 14 is hollow along its entire longitudinal axis from end 20 to end 22, and is preferably stainless steel, as are all components of the purge block other than the seals, washers and extension tube, as will be described.

More specifically, one end 24 of fitting 16 has a hexagonal cross-section and is internally threaded. Integral therewith is a circular plate 26, a shoulder 28, an externally threaded end 30, and a vent tube 32, as clearly shown in FIG. 1. Fitting 16 is hollow along its entire longitudinal axis from end 34 to end 36, to provide an inlet passageway for argon or other inert gas, such as $CO_2$, nitrogen, etc. Vent tube 32 is hollow from one end 38 to the other end 40, and, although the tube is integrally formed on fitting 16, the passageway thereby provided is separate from that extending between ends 34 and 36 of the fitting.

Fitting 18 has a hexagonal end portion 44 integrally joined to a circular plate 46, shoulder 48, and an externally threaded Portion 50. Fitting 18 is provided with a passageway or bore along its longitudinal axis from extreme end 52 through end portion 44 only, terminating at a set of six discharge ports 54 extending radially outwardly from the internal passageway or bore to the fitting exterior. The discharge ports are preferably equally spaced circumferentially around the hexagonal cross-section of end portion 44. Shoulder 48 and threaded end 50 are solid.

The seals 10 and 12 have a circular cross-section with a hollow center adequately sized to permit mounting over the threaded ends and shoulders of their respective fittings, and are preferably made of Armaflex ® insulating foam rubber, which is commercially available from Armstrong World Industries. Alternative materials for the seals, useful in some applications, include ⅛ inch high-temperature silicone rubber rated to 700° F., ceramic, 3M Scotchbrite ®, cleaning sponge, Teflon ®, PVC, plastic, Lexan ® and the like.

Rigid washers 41 and 42, preferably Teflon ®, are mounted adjacent seal 10 for support thereof. Rigid washers 64 and 65 are likewise mounted adjacent seal 12 for support thereof, and are also preferably Teflon ®. If desired, such as to extend the life of Armaflex ® insulation after it begins to break down from normal use, used seals can be stacked together, in which case the stacked seals provide some mutual support. All four washers are preferably selected according to the size of the seal with which they are to be used such that their diameter is approximately in proportion to that of the seal as shown in the drawings.

A circular end plate 56 with an unthreaded hollow center is mounted adjacent to washer 41 on fitting 16, and the seal, washers and end plate are held in place on the fitting by a quick-disconnect air hose fitting 60, which as shown includes a nut 62 which is internally threaded for this purpose. Similarly, seal 12, washers 64 and 65 and a circular end plate 66 with an unthreaded hollow center are held in place on fitting 18 by a nut 70, the threads of which engage threaded end 50 of the fitting.

It will be appreciated from the foregoing description and the accompanying drawings that the purge block of FIGS. 1 and 2 provides a continuous supply passageway through inlet fitting 60, plate 56, washer 41, seal 10, washer 42, fitting 16, tube 14, and end portion 44 of fitting 18 to discharge ports 54. Seal 10 and its associated washers and end plate are provided with an axial opening therethrough to permit mounting over the portion of vent tube 32 closest to end 40, and there is thus provided a return passageway from end 38 to the outside atmosphere.

Pull hooks or loops 58 and 68 are provided on end plates 56 and 66, respectively, to enable ready retrieval of the tool from a pipe with a stainless steel cable, for example, attached to one of the pull hooks prior to use for this purpose. Other tensioning devices may be employed, and, in particular, electrician's fishtape has been found useful. Preferably, carbon steel fishtape is enclosed within a PVC hose for this purpose. In many applications, the tool can be pulled out with the hose 72 attached to quick-disconnect fitting 60.

A typical position for the purge block during a welding operation is shown in FIG. 2. The joint 75 between two abutting pipe sections 74 and 76 is enclosed on the exterior of the pipes by a weld head 78 of conventional design, such as an orbital weld head commercially available from Arc Machines, Inc. among others. According to one installation method, weld head 78 is first connected to one pipe section 76, a hose 72 connected to an argon source (not shown), is fed through a pipe section 74 and connected to the inlet fitting 60 at the purge block, the other end of which is then manually placed into pipe section 76 in the position shown in FIG. 2. Pipe section 74 is then manually slid over seal 10 and into position in the weld head. If desired, an auxiliary hose may be connected from outlet 40 of vent tube 32 to a gas analyzer to measure oxygen content as air is evacuated from the enclosed region 80 in the pipe interior between the purge block seals. Air is evacuated from this region by supplying argon under pressure via supply hose 72 into the purge block and therefrom via region 80 via discharge ports 54 on the opposite end of region 80 from vent tube 32, through which air is forced out of the region and into either a gas analyzer or the outside atmosphere, with the directions of gas flow as illustrated in FIG. 2.

Figure 3:
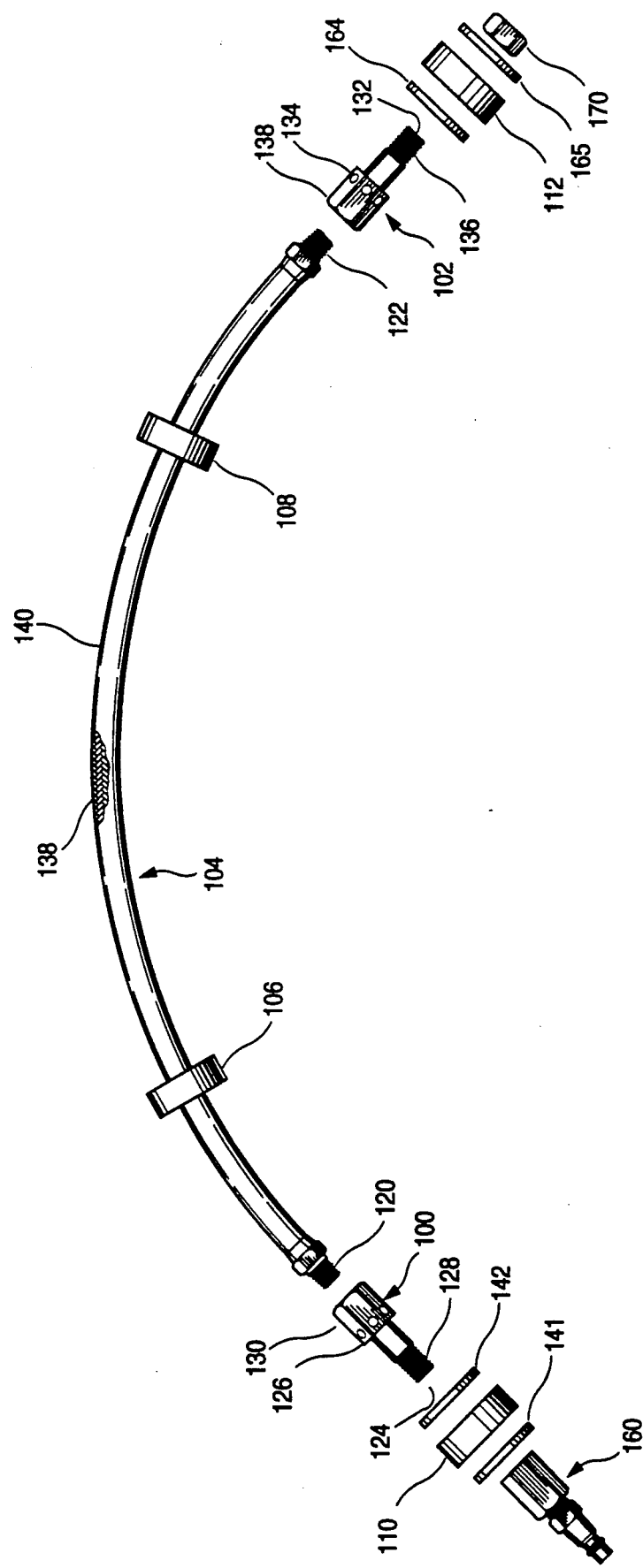
FIG. 3 is an exploded view of a second embodiment of a purge block according to the present invention.
Figure 4:
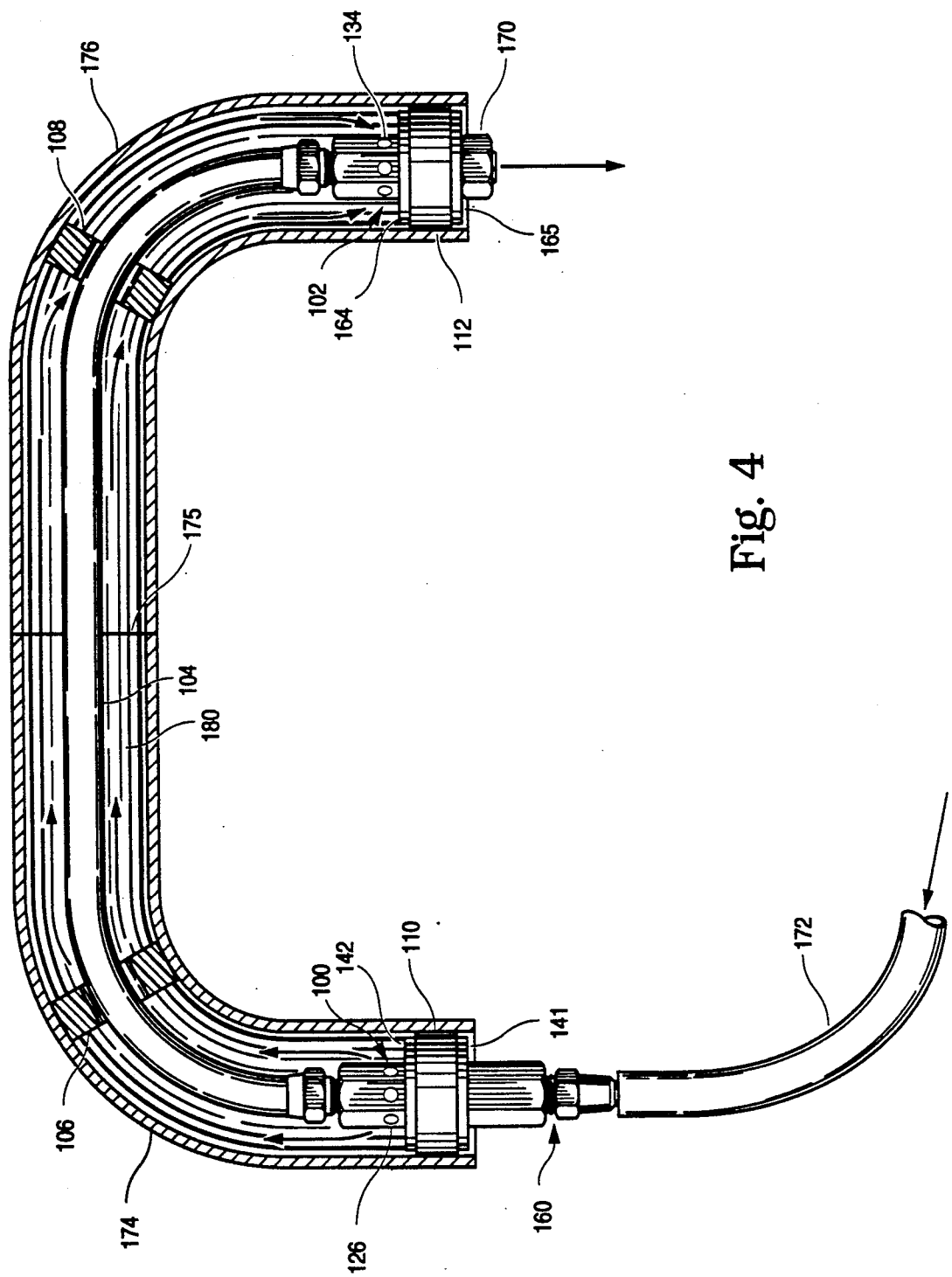
FIG. 4 is a cross-sectional top view of a pair of abutted pipe sections with a purge block of the type shown in FIG. 3 positioned therein.

Referring now to FIGS. 3 and 4, there is shown an embodiment of the present invention which is particularly suited for use in curved pipe sections, although it is also useful in straight pipe sections. This embodiment preferably has an inlet fitting 160, a first seal 110 with Teflon ® washers 141 and 142 adjacent thereto, a fitting 100, an elongate tube 104, a fitting 102, a second seal 112 with Teflon ® washers 164 and 165 adjacent thereto, a nut 170, and two Teflon ® spacer rings 106 and 108, all arranged as shown. Unlike fittings 16 and 18 described with reference to FIGS. 1 and 2, fitting 100 is hollow along its longitudinal axis from extreme end 124 of externally threaded end 128 to a plurality of radially extending discharge ports 126 in an otherwise solid end 130. Likewise, fitting 102 is hollow along its longitudinal axis from extreme end 132 of externally threaded end 136 to a plurality of radially extending discharge ports 134 in an otherwise solid end 138. Ends 130 and 138 of fittings 100 and 102 are internally threaded for engagement with respective mating externally threaded ends 120 and 122 of tube 104.

The inner diameter of rings 106 and 108 is larger than the outer diameter of tube 104, as illustrated in FIG. 4, thereby enabling a flow of air and gas in the direction of the arrows. Specifically, argon gas is supplied through hose 172 in the direction of the arrow into fitting 160 of the purge block, and flows through that inlet fitting, washer 141, seal 110, washer 142, and fitting 100 to discharge ports 126, through which it passes into the region 180 in the interior of the pipe between seals 110 and 112. Flow of air followed by argon proceeds through region 180 in the direction of the arrows, passing through the gaps between rings 106 and 108 and tube 104, and passing joint 175, which at this time is sealed from the outside by a weld head (not shown) of the type described above. The air and gas enter discharge ports 134 in fitting 102 and flow through that fitting, and washers 164 and 165, seal 112 and nut 170 mounted thereon, out of the purge block in the direction of the arrow. Discharge ports 126 and 134 help diffuse argon in the interior region and thereby facilitate complete evacuation of oxygen therefrom.

The central portion of tube 104 is flexible enough to negotiate curves such as those shown in FIG. 4, and is preferably silicone rubber encased in a steel braid 138 which is in turn covered by a tubing layer 140 made from high-temperature silicone rubber rated to 700° F. Layer 140 acts as a thermal insulator and prevents the steel braid from inadvertently being welded to the inside of the pipe. Similarly, the function of rings 106 and 108 is to keep tube 104 away from the inside surface of the pipe, and the rings are preferably each positioned in a curve for this purpose, as shown in FIG. 4.

A significant advantage of the present invention is the flexibility of use provided by interchangeability of parts on a single purge block. All parts of the tool are readily removable to adapt the tool for different applications. For example, the tool can be readily assembled with seals selected for a particular size of pipe, without replacing any other components of the tool, although preferably the washers are also changed as necessary for support of a different size seal, as noted above. The first embodiment described above is believed to be widely applicable to a large number of sizes of pipe and tubing, extending at least from two inches in diameter to forty-eight inches or more in diameter. The second embodiment is believed to be particularly useful in smaller pipes and tubing, e.g., one and one-half to two inches in diameter. However, either design of the tool is readily adaptable to many pipe sizes, and the conduit structure (and corresponding gas flow direction) of each is adaptable to curved and straight pipes if desired. In addition, the length of tube 14 or 104 is readily changed for different conditions, i.e., when a larger or smaller region is desired around a desired weld joint, although in most cases a purged region extending approximately six inches on either side of the weld joint is sufficient to purge the weld area while still protecting the tool from heat. Further, the seals can be adjusted in size so that one end of the tool fits snugly into a tube and the other end fits loose so the tube can slip over the tool during installation. This technique also helps to keep the tool in place.

Another significant advantage of the present invention is its ability to travel in response to positive or negative pressure. While in many cases the purge block is placed in position at the time of welding when piping is being installed, it will travel with positive or negative pressures to a tack weld area, for example. Alternatively, the tool can be pulled or pushed. The use of a positive pressure helps dislodge the tool should it become stuck or lodged along with a hose or cable normally used to extract it. Positive pressure from the other end of the tool will add force to assist in dislodging the tool. Preferably, the purge block is designed such that it can be advanced inside a pipe in which it is used by means of a vacuum cleaner, such as a Shop-Vac ® industrial vacuum cleaner, or even a household vacuum cleaner. It has been found suitable for this purpose to have the outer diameter of an Armaflex ® seal equal the outer diameter of the pipe in which it is to be used, with the Armaflex ® seal naturally compressing somewhat upon insertion into the pipe. It has also been found suitable to use a sharpened edge of a pipe of suitable size to cut seals out of a sheet of Armaflex ®, which sheet may vary in size from approximately 1 inch thickness for smaller seals to approximately 2 inch thickness for larger seals.

If, instead of Armaflex ®, a substantially noncompressible material is used, e.g., Teflon ®, ceramic, Lexan ®, or silicone rubber more than approximately one-half inch thick, the seal should have an outer diameter approximately 0.050" less than the inner diameter of the pipe in which it is to be used, in order to provide sufficient clearance to enable the purge block to travel and also to allow for irregularities in the pipe while still providing a sufficiently close fit for establishment of a locally inert atmosphere as desired.

A vacuum cleaner has been found particularly useful during installation of the purge block, although it is also believed to be useful for withdrawal of the tool after use. Preferably the vacuum cleaner is used with an attachment having a hole through a flat surface which can be placed against the end of a pipe section to seal off the end of the pipe and establish a vacuum between that pipe edge and one end of one of the seals of the purge block, e.g., the right-side end of seal 12 as shown in FIG. 2.

This tool can also be used through and into full port valves (ball and gate), 90° and 45° bends and T-sections, fittings and piping accessories, and anywhere there is not a drastic change in pipe or tube inside diameter. The tool is completely compatible with 316L tubing used in piping within pharmaceutical plants. The tool of this invention is preferably 100% 300-series stainless steel, except as noted herein. Alternatively, tube 14 could be Teflon ®. The embodiment of FIGS. 3 and 4 adapts very well to irregularly shaped tube or fittings and can be used, for example, to install a reducing fitting and still be pulled through it after welding. The tool works well with cast iron pipe, copper tube or pipe, chrome-moly and other alloys, etc.

The embodiment of FIGS. 1 and 2 is preferably positioned with end 38 of vent tube 32 at the top as shown in the drawings, in order to facilitate complete evacuation of oxygen, which is lighter than argon. In general, the vent tube is placed above the other end of the purge block for this reason. An extension tube 39 is provided for larger size pipes, to ensure that the end of the vent tube inside region 80 is as close as possible to the top of that region.

The externally threaded ends of fittings 16, 18, 100 and 102 are all ½-13, and the threaded ends of tubes 14 and 104 are ¼-NPT (National pipe thread). All threaded parts are preferably right-hand threaded, and in any event are provided with mating threads for the part to which they are connected.

For applications in the pharmaceutical industry and in other sensitive environments, the entire purge block can be sterilized and also passivated to remove impurities from stainless steel by an acid process.

The disclosed tool works with all automatic weld fittings and works equally well with most other weld fittings, and is also useful for hand-welding operations. Although described above in terms of round tubing and pipe, the principles of the invention can also be applied to round or square duct work by means of corresponding changes in the shape and/or size of the seals. The disclosed tool is also useful in other applications, such as scrubbing or cleaning the interior of a pipe, tubing or duct work: Cleaning solvent, caustic or soap may be supplied through inlet fitting 160 instead of an inert gas, and the tool may then be pulled back and forth, e.g., by cables or wires attached to loops 58 and 68 in FIGS. 1 and 2.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A purge block for use in establishing a localized inert atmosphere inside two abutting pipe sections in the region of a desired weld joint, comprising:
    a semi-rigid elongate tube having a longitudinal axis, said semi-rigid tube having inner and outer tubing layers of silicone rubber and a middle layer of steel braid;
    first and second non-inflatable, disc-like seals constructed of insulating foam rubber and removably mounted on opposite ends of said tube, each of said non-inflatable, disc-like seals defining a passageway extending therethrough along said longitudinal axis;
    conduit means for supplying an inert gas from a source thereof through said passageway in said first seal and into the region of the desired weld joint;
    a rigid washer positioned on said longitudinal axis adjacent each end of each of said non-inflatable, disc-like seals for support thereof, said washers between said seals being constructed of Teflon ®; and
    a plurality of Teflon ® spacer rings slidably mounted on said tube and spaced apart from said non-inflatable, disc-like seals, said spacer rings each having an inner diameter sufficiently greater than the outer diameter of said tube to allow the flow of gas therebetween;
    wherein said conduit means includes a first stainless steel fitting having an externally threaded inlet end with an axial opening and an internally threaded outlet end with a plurality of radial openings, said inlet end of said first stainless steel fitting mounted within said passageway through said first non-inflatable, disc-like seal;
    wherein said conduit means further includes a second stainless steel fitting having an internally threaded inlet end with a plurality of radial openings and an externally threaded outlet end with an axial opening, said outlet end of said second stainless steel fitting mounted within said passageway through said second non-inflatable, disc-like seal; and
    wherein said fittings each define a hollow portion extending between their respective axial openings and plurality of radial openings along said longitudinal axis.

* * * * *